(12) United States Patent
Busby

(10) Patent No.: US 6,685,395 B1
(45) Date of Patent: Feb. 3, 2004

(54) PILING FENDER

(75) Inventor: Robert B. Busby, Pawling, NY (US)

(73) Assignee: Pawling Corporation, Pawling, NY (US)

( * ) Notice: Subject to any disclaimer, the term of this patent is extended or adjusted under 35 U.S.C. 154(b) by 0 days.

(21) Appl. No.: 10/209,577

(22) Filed: Jul. 31, 2002

(51) Int. Cl.[7] .............................................. E02B 3/28
(52) U.S. Cl. ...................... 405/215; 405/212; 114/219
(58) Field of Search ........................ 114/219; 405/211, 405/212, 215; 267/139, 140; 411/155, 156, 161, 162, 163, 164, 84, 85

(56) References Cited

U.S. PATENT DOCUMENTS

| | | | | |
|---|---|---|---|---|
| 261,947 | A | * 8/1882 | Murphy | ........................ 411/155 |
| 2,935,855 | A | * 5/1960 | Reid | ........................... 405/215 |
| 3,059,589 | A | * 10/1962 | Schreyer | ...................... 411/84 |
| 3,372,552 | A | 3/1968 | Liddell | |
| 3,449,917 | A | * 6/1969 | Roskkopf | ................... 405/215 |
| 3,740,455 | A | * 6/1973 | Willox | ........................ 174/101 |
| 3,950,953 | A | 4/1976 | Matthews | |
| 3,975,916 | A | 8/1976 | Watson | |
| 4,439,071 | A | 3/1984 | Roper, Jr. | |
| 4,571,123 | A | * 2/1986 | Chandra et al. | ............ 405/212 |
| 4,641,999 | A | 2/1987 | Korbuly | |
| 4,664,053 | A | 5/1987 | Mesinger | |
| 4,964,760 | A | 10/1990 | Hartman | |
| 5,018,471 | A | 5/1991 | Stevens | |
| 5,031,564 | A | * 7/1991 | Beckerer, Jr. | ................ 114/219 |
| 5,546,723 | A | * 8/1996 | Jones | ...................... 411/163 X |
| 5,562,364 | A | 10/1996 | Darder-Alomar | |
| D387,441 | S | 12/1997 | Rasmussen | |
| 5,762,016 | A | * 6/1998 | Parsons | ....................... 114/219 |
| 5,839,854 | A | 11/1998 | Streszoff et al. | |
| 6,289,836 | B1 | 9/2001 | Tellex | |
| 6,327,989 | B1 | 12/2001 | Beach | |

FOREIGN PATENT DOCUMENTS

JP 2-279235 * 11/1990
WO WO 97/44236 11/1997

* cited by examiner

Primary Examiner—Heather Shackelford
Assistant Examiner—Sunil Singh
(74) Attorney, Agent, or Firm—Schweitzer Cornman Grass & Bondell LLP

(57) ABSTRACT

A dock fender, particularly for attachment to the outer face of a dock piling for cushioning vessels attached to the dock. The fender is of extruded construction, having laterally extending flanges which are conformable to the surface of the pilings. The fender is attached to the piling by lag screws applied to the flanges. Special washers, of rectangular configuration, are provided to underlie the heads of the lag screws. The washers are formed with anti-rotation means such that, after initial proper alignment of the washers with the fender flanges, the washers will retain such orientation during rotational tightening of the lag screws. In one form, the anti-rotation means comprises bent corners of individual washers. In another form, the washers are of a length to engage more than one lag screw.

2 Claims, 4 Drawing Sheets

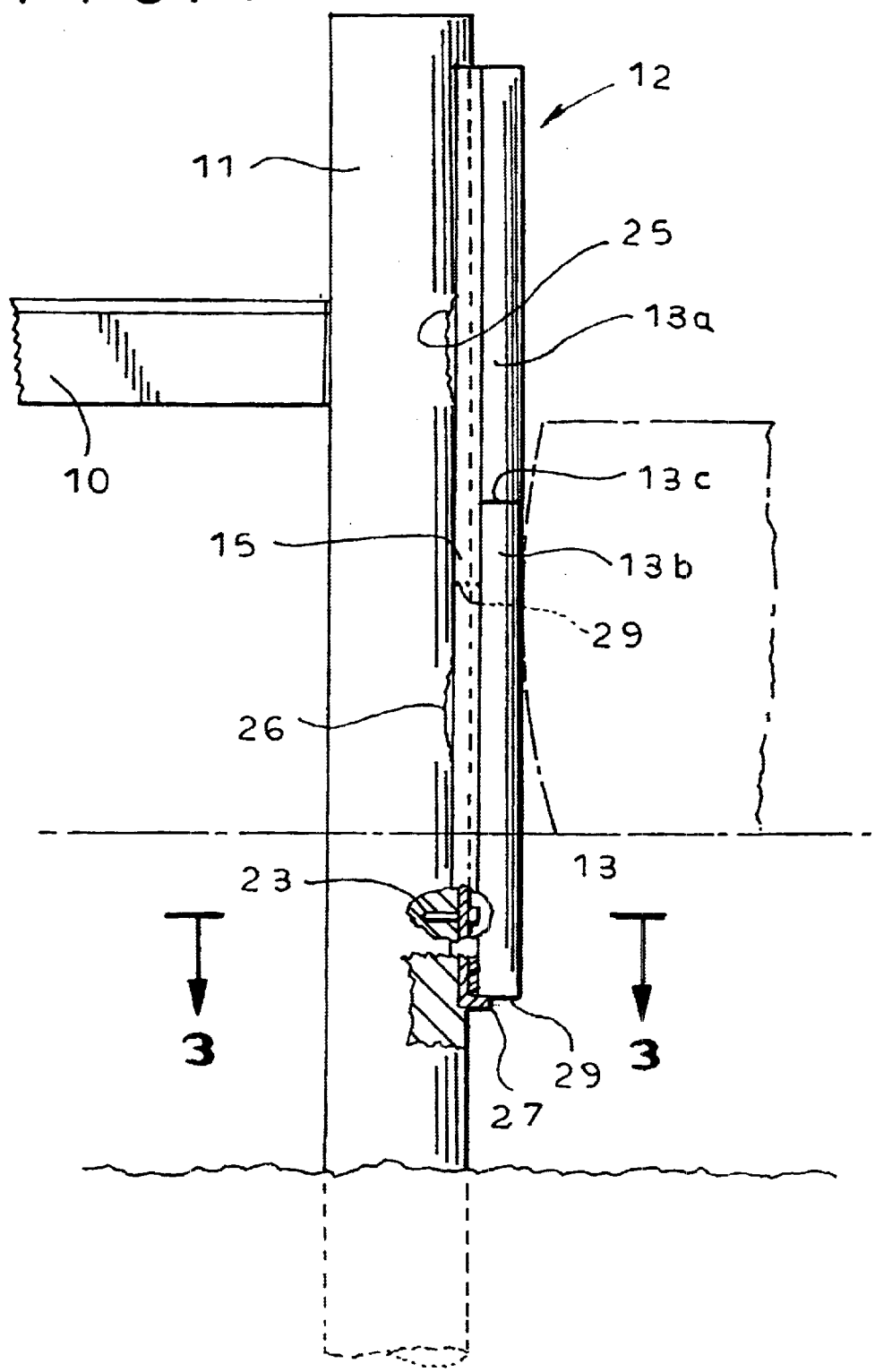

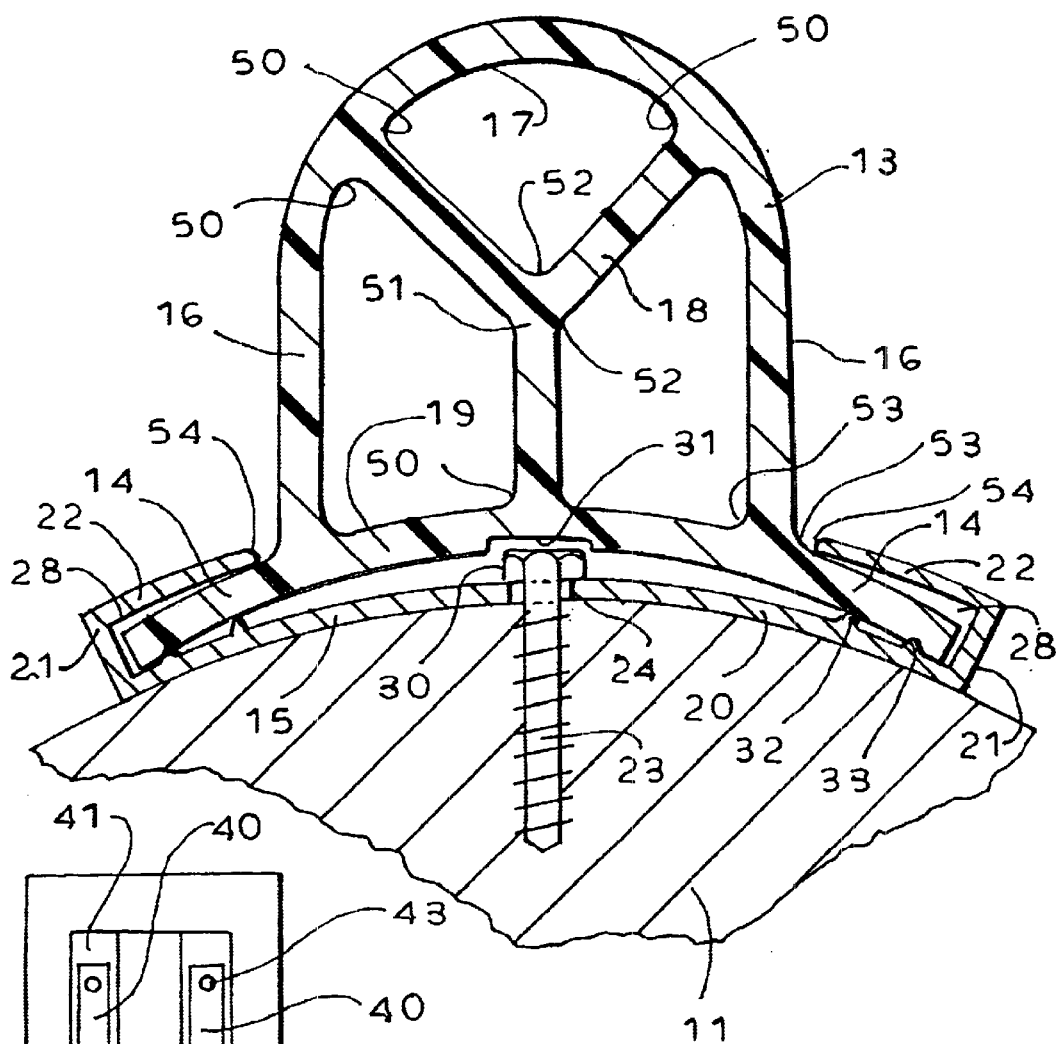

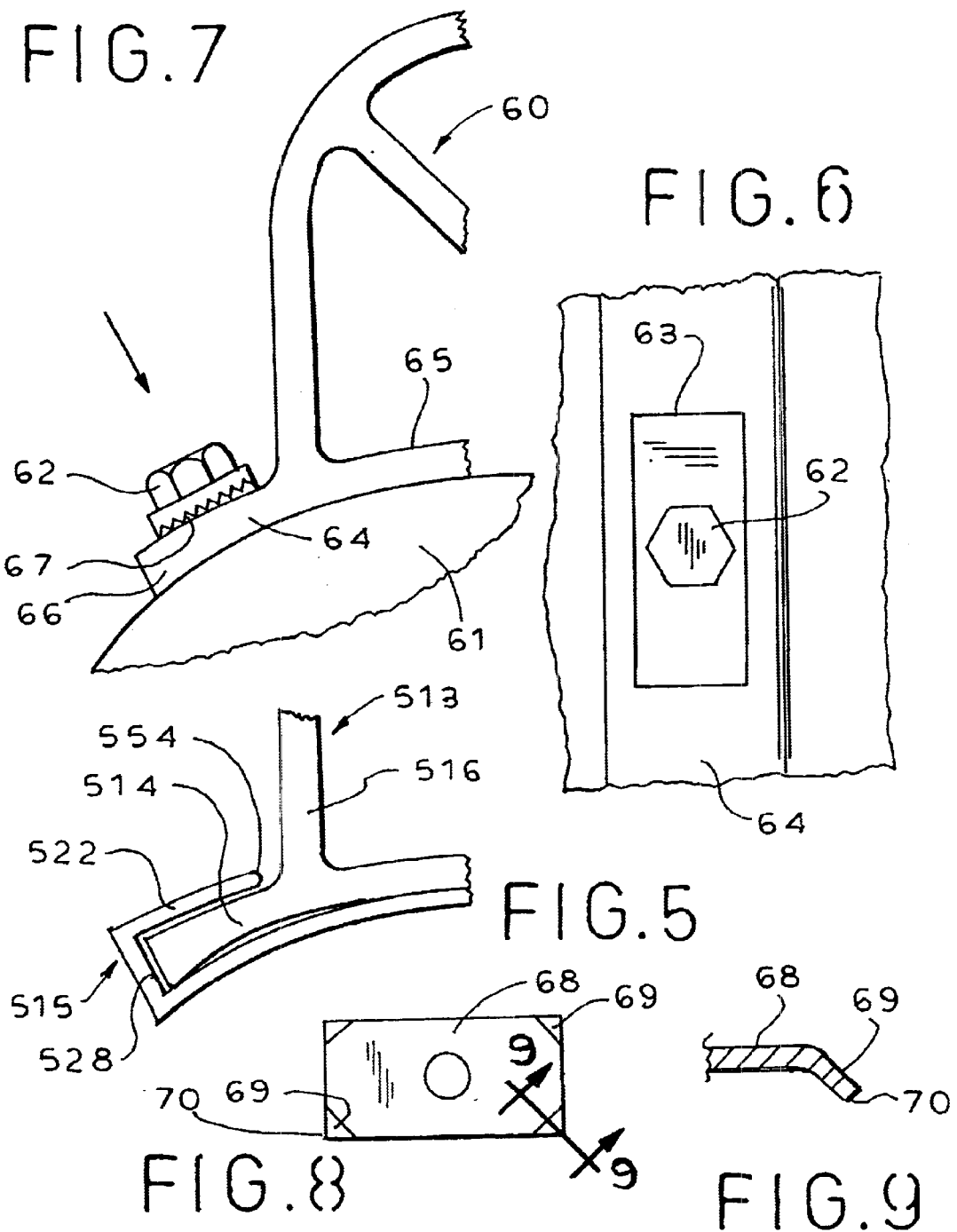

PILING FENDER

BACKGROUND OF THE INVENTION

Piling fenders are commonly used in connection with fixed docks supported by vertical pilings driven into the seabed. To avoid damaging the top sides of vessels approaching and tied to the dock, resilient fender elements commonly are secured to the outer surfaces of the piling, extending vertically along the piling over the region thereof expected to be contacted by vessels of various sizes and at various stages of the tides in tidal waters. One common type of dock piling is round wooden piling which is driven deep into the seabed, leaving a portion exposed above the water level for securing and supporting the dock. Various forms of resilient devices are secured to outer surfaces of such pilings, using nails, lag screws or the like. An example of such is shown in the Matthews U.S. Pat. No. 3,950,953.

Piling fenders of the type indicated above tend to become quickly damaged and unsightly, as a result of contact with vessels moving either forwardly or rearwardly at the time of contact. Particularly in the case of wooden pilings, the contours of such pilings frequently are irregular, either naturally or because of damage resulting from contact with vessels. Thus, piling fenders frequently are not fully supported underneath, and are therefore prone to lateral distortion, which can in some cases tear the fasteners out of the piling and in other cases tear the fender material away from the fasteners.

Among other things, standard piling fenders when partially detached from a piling, are very unsightly and give the appearance of a poorly kept marina.

In some cases, piling fenders designed for installation in either round or flat-faced pilings are formed with a flat face contour. When such fenders are applied to round pilings, the fenders conform to the surface contours of the piling only in the immediate areas of the fastening devices. Because the fender material is resilient in nature, the fender sections tend to revert to their original flat base contours in the spaces between vertically adjacent fasteners. This not only gives the entire installation a somewhat unsightly appearance, but it also makes the fender more easily prone to damage and distortion because the fender edge can easily be snagged in areas between fasteners, by a vessel moving forwardly or rearwardly at the moment of contact.

SUMMARY OF INVENTION

Pursuant to a preferred embodiment of the invention, a novel and improved piling fender is provided which comprises a continuous, rigid retaining channel, which is secured to the front face of a piling and forms a vertical channel into which the resilient fender element is installed and retained.

The retaining channel, which is contoured to conform generally to the contours of the piling, is fixed to the piling at a plurality of vertically spaced locations. Opposite side edges of the retaining channel extend inward over the opposite side margins of the channel to form inwardly facing retaining slots for receiving opposite side flanges of a resilient fender element. The fender is in the form of a continuously extruded section, having a base flange and an outwardly projecting contact portion. The base flange advantageously is contoured to correspond to the contours of the retaining channel, and its flanges are arranged to be in and contained by the side edge portions of the retaining channel.

Pursuant to one aspect of the invention, the retaining channel is open at the top and closed at its lower end. Resilient fender elements are slideably received in the retaining channels, and are inserted from the top and slid down to a stop position formed at the lower end of the channel. Preferably, the retaining channel extends over the full vertical area of the piling to be protected. The retaining channel may, however, receive a plurality of fender elements, stacked one above the other and collectively extending over the desired length of the retaining channel.

The arrangement of the invention, as described above, provides for a neat, clean and uniform appearance of the marina pilings. The fastening devices, used for securing the retaining channels to the pilings are both concealed and protected by the overlying fender elements. Additionally, the rigid retaining channels extend straight down the piling elements, bridging over any gouged areas of the piling, providing neat appearing, straight edges and providing support and refinforcing for the fender in the gouged areas.

In some dock structures, the pilings may have flat outer faces, as in the case of many concrete pilings, for example. In such cases, the retaining channel members and the associated fender elements may be formed with a flat configuration.

Although the principal preferred embodiment of the invention involves the utilization of rigid retaining channels, there are certain instances in which the use of retaining channels is inappropriate, for such cases, the fender elements may be secured directly to the pilings by spaced apart fasteners in conjunction with elongated, rigid retaining strips which contain and conform the flanges of the fender elements in the areas between fasteners.

In certain instances, piling fenders of arcuate configuration, designed especially for cylindrical pilings, may be attached to flat-faced pilings using linearly spaced fastening elements. Unlike attempts to fasten flat-configured fenders to cylindrical pilings, which leave the fenders exposed and subject to damage as mentioned above, the edge extremities of an arcuately configured fender can be held tightly against the face of a flat piling using linearly spaced fastening elements. This enables a marina having both flat and cylindrical pilings to use a common, arcuately configured fender throughout.

For a more complete understanding of the above and other features and advantages of the invention, reference should be made to the following detailed description of preferred embodiments, and to the accompanying drawings.

DESCRIPTION OF THE DRAWINGS

FIG. 2 is a fragmentary side elevational view of the dock structure of FIG. 1.

FIG. 3 is an enlarged, fragmentary cross sectional view as taken generally on line 3—3 of FIG. 2.

FIG. 4 is a fragmentary elevational view of first alternative form of the invention.

FIG. 5 is a fragmentary plan view of a second alternative form of the invention.

FIG. 6 is an enlarged, fragmentary front elevational view of a third alternative form of the invention.

FIG. 7 is a fragmentary end elevational view of the alternative form of the invention shown in FIG. 6.

FIG. 8 is a top plan view of an advantageous form of rectangular washer utilized to advantage in mounting certain forms of the new piling fender.

FIG. 9 is an enlarged, fragmentary cross sectional view as taken generally on line 9—9 of FIG. 8.

DESCRIPTION OF PREFERRED EMBODIMENTS

Figure 1:
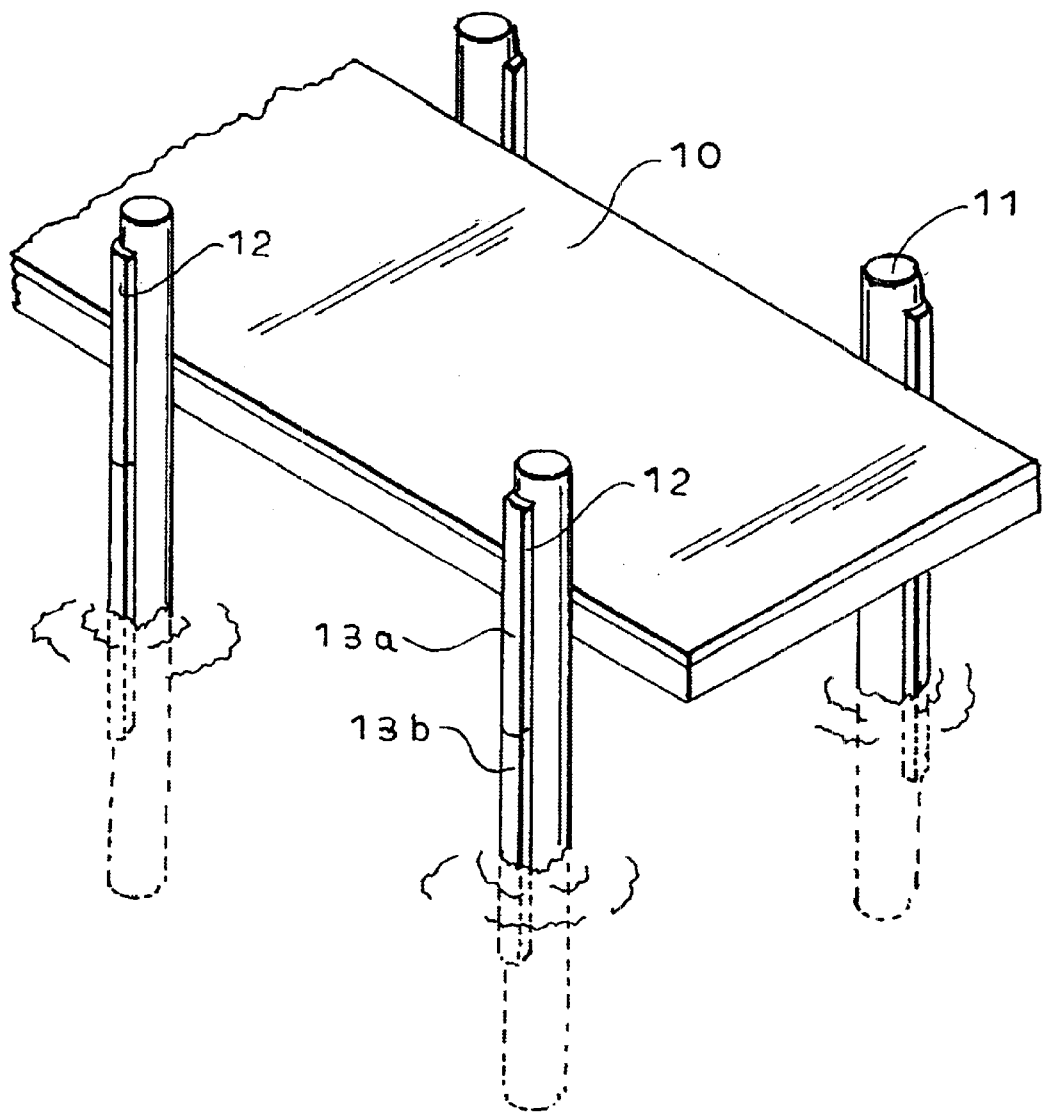
FIG. 1 is a perspective of a typical dock structure supported by wooden pilings and utilizing piling fenders according to the invention.

Referring now to the drawings, FIG. 1 represents a typical form of fixed dock structure, in which a dock platform 10 is supported on opposite sides by multiple vertical pilings 11 driven into the seabed. The platform 10 is rigidly secured to the pilings by suitable means, such as bolts (not shown).

Vessels approaching and/or tied up at the dock have to be concerned about avoiding direct contact between the topsides of the vessel and the outer surfaces of the pilings 11, to prevent damaging the vessel. The vessel can (and sometimes does) provide its own fendering. However, many marinas provide vertical fendering along the outside faces of the pilings, as indicated generally at 12 in FIG. 1. Such fendering extends over a sufficient vertical portion of the pilings 11 to provide protection for vessels of various sizes at various stages of tide. Because of the rather severe duty to which the piling fenders are subjected in resisting contact by heavy vessels, and because the somewhat harsh environment presented by at least periodic partial immersion in tidal salt water, the maintenance of piling fenders in good condition over a period of time has proven to be very difficult.

In accordance with one aspect of the present invention, a novel and improved form of piling fender is provided in which a rugged resilient fender 13 is provided with opposed side flanges 14 engaged over substantially their full length by a rigid, vertically disposed retaining channel 15, which is tightly secured to the piling 11.

In one particularly advantageous form of resilient fender 13, the fender may be of an extruded construction, formed of a heavy duty vinyl of, for example, about 90 durometer, formed with walls of, for example, 5/16th inch in thickness. The vinyl material of the fender advantageously includes additives for ultraviolet stabilization and resistance and for lowering the coefficient of friction. Low friction characteristics are desirable both to allow an approaching vessel to move after contact with the fender, without excessive resistance from the fender, and also to facilitate installation of the fender section into a retaining channel. The internal structure of the fender, can be based in part upon an existing cross section, such as Style MD-7, marketed by Pawling Corporation, of Pawling, N.Y. Such configuration generally includes a projecting outer wall structure formed with generally straight side walls 16 and a curved (e.g., semi-circular) outer wall 17 supported internally by Y-shaped web walls 18.

Pursuant to the invention, a base wall 19 of the fender is formed of an arcuate contour and has portions extending laterally from the opposite side walls 16 to form the flanges 14. In a typical but not limiting embodiment, the outwardly projecting portion of the fender 13 may have a width of about three inches between the side walls 16, with the flanges 14 extending perhaps one inch laterally outward beyond the limits of the side walls. The overall outward projection of the fender may be on the order of three inches, for example. It will be understood, of course, that specific sizes and dimensions are for illustrative purposes only as the fender assembly may be provided in various sizes to accommodate different types of marina services.

In accordance with the invention, the retaining channel 15 is formed of a rugged, relatively rigid material, such as extruded aluminum. It is contemplated that the extruded channels will be cut to suitable lengths, preferably to extend over the full fendered height along the piling face, as shown particularly in FIG. 2. In a typical but not limiting case, this may involve a length of about eight feet.

Typical round pilings are predominantly of a diameter in the range of around twelve-sixteen inches, and thus the channel 15 advantageously is formed with a base wall 20 curved along a radius of about six inches for conformance to the outer surface of the piling, as indicated in FIG. 3. The channel extrusion preferably is formed with opposite edge walls 21 extending in a generally radial direction (i.e., perpendicular to the adjacent portions of the base wall 20). Integral, overlying channel-forming flanges 22 extend inwardly from the edge walls 21, in spaced relation to the base wall 20, as indicated in FIG. 3. This structure of the panel extrusion makes it quite rigid along its length, as will be understood.

Desirably, the retaining channel 15 is secured to the face of the piling at a plurality of vertically spaced points, for example, spaced apart by eighteen inches or so. Lag screws 23 (FIG. 3) are suitable and advantageous for this purpose, and openings 24 can be provided along the length of the retaining channel for receiving the lag screw fasteners. Typically, at least lower portions of the retaining channel 15 and at least one of the lag screws 23 will be under water at least some of the time during tide cycles.

One of the advantages of the rigid retaining channel 15 is evident in FIG. 2, where it is seen that the piling 11 frequently has irregular or gouged out surface contours, as at 25 and 26 in FIG. 2. The rigid channel member 15, when secured to the face of the piling, bridges over such irregularities and provides support for the resilient fender in such areas.

In a preferred form of the invention, portions of the channel material at the lower end of the retaining channel are bent outward, as indicated at 27 in FIG. 2, to form an abutment stop for supporting the lower end of a fender section 1. The upper end of the channel may be open. Accordingly, the resilient fender element 13 may be inserted into the upper end of the retaining channel, with its base flanges 14 being received in the side channels 28 formed at each side of the retaining channel. The fender element is slid downward into the retaining channel, until the lower end 29 of the fender element is engaged by the abutment stop 27. As indicated in FIG. 2, the body portion of the fender element 13 projects outward from the retaining channel for about three inches, for example, providing full height protection along the vertical area of the piling 11 desired to be protected.

Although the retaining channel 15 desirably extends continuously over the full length of the piling to be protected, the fender element 13 may be installed in a plurality of separate lengths less than the total length of the retaining channel. This is reflected in FIG. 2, for example, wherein upper and lower sections 13a, 13b of the resilient fender material are inserted into the retaining channel, with the combined length of the two sections 13a, 13b making up the overall desired length of the fender. The use of a plurality of fender sections can simplify both the initial installation and subsequent maintenance, in case a portion of the resilient fender material becomes damaged. It will also be possible for the retaining element itself to be installed in more than one sections abutting closely at a joint 29 (FIG. 2), with adjacent sections being carefully aligned during installation. In such a case, it would be advantageous that the respective lengths of the retaining channel portions and fender portions be designed so that any joint 13c formed by abutting edges of adjacent sections of fender elements is offset from the joint 29 formed by abutting sections of retaining channel.

In tidal waters, it is typically necessary that lower portions of the fender assembly will be immersed in the salt water for at least portions of the tidal cycle and in many cases for extended periods of time. This frequently results in destruction over time of the securing elements, by which the fendering arrangement is secured to lower portions of the piling. With conventional fendering installations, this typically results in detachment of the lower portion of the resilient fender, which not only looks unsightly, but makes the fendering material much more prone to being damaged by engagement with a moving vessel.

In the system of the invention, should the lowermost lag screws 23 eventually fail, the retaining channel 15 remains reliably secured to the piling by reason of the securement of upper portions of the channel, offering ample opportunity for a marine operator to make necessary repairs. In the meantime the fender remains fully supported by the retaining channel and the installation retains its neatly kept, uniform appearance.

In a preferred embodiment of the invention, the designed curvature of the base portion 19 of the fender sections advantageously is of a somewhat smaller radius than the radius of the channel base 20. This causes the center portion of the fender base 19 to separate away from the channel base 20 slightly in order to clear the projecting heads 30 of the lag screws 23. Additionally, it may be advantageous to form a continuous recess 31 in the bottom surface of the fender base 19, to assure adequate clearance. These measures facilitate linear sliding installation of the fender sections 13 into the retaining channel 15, as will be appreciated.

Significantly, when the fender sections 13 are in place, the securing law screws 23 are completely concealed and protected by the fendering material, so they are neither visible to the eye nor subject to contact by an adjacent vessel.

Desirably, the base wall 20 of the retaining channel 15 may be provided within the opposite side channels 28 with one or more small, longitudinally continuous ribs 32, 33 which underlie the flange portions 14 of the fender base, when the fender sections are installed within the retaining channel. Should the fender element 13 be impacted heavily by a vessel having some forward or rearward motion at the time of impact, the engaged fender element or elements will be pushed toward one edge or the other of the retaining channel. The pointed ribs 32, 33 will, in such cases, tend to resist any lateral movement of the fender flange portions 14, helping to assure that the flange portions are reliably retained within the side channels 28 against such forces of lateral impact.

In a modified form of the invention shown in FIG. 5, the outwardly extending flange portions 514 of the fender are of a tapered configuration, being of greater width at their outer ends than at the inner ends, adjacent to side walls 516. By way of example, in a fender of the example dimensions previously indicated, the thickness of the flange 514 at the outer extremity may be on the order of 0.375 inch, while at the inner extremity the thickness may be on the order of 0.250 inch. This reversely tapered configuration of the flange has several advantages, as will appear.

In the embodiment of FIG. 5, where the fender 513 is slideably received in a rigid retaining channel 515, the overlying, channel-forming flanges 522 are configured to form side channels 528 of a similar, reversely tapered configuration. Desirably, the channels 528 are of somewhat greater thickness than corresponding areas of the flanges 514. However, in accordance with the invention, the narrowest portion of the side channel 528, formed by the inner edge 554 of the channel-forming flange 522, defines a channel opening which is narrower than the wide edge of the flange 514. In a typical and illustrative (but not limiting) example, the dimensions of the side channels 528 may be, for example, 0.500 at the outer extremities, and 0.343 at the inner edge, adjacent to the flange edge 554. The narrowest channel dimension, 0.343, is less than the widest dimension (0.375) of the flange 514. As a result, if the fender 513 is impacted heavily by a vessel which is still in motion, which can tend to displace the fender laterally, the complete displacement of the flange 514 from the channel 528 is strongly resisted as the progressively widening flange moves laterally within the progressively narrowing side channel. At the same time, there is ample "normal" clearance between the flange 514 and the side channel 528 to accommodate easy longitudinal insertion of the fender into the retaining channel 514.

Although the majority of dock pilings tend to be of a cylindrical configuration, many concrete pilings, for example, are of a rectangular configuration, presenting flat outwardly facing surfaces. The principles of the described invention apply as well to such flat-faced pilings. For such applications, the retaining channel 15 typically will be of a flat configuration (not specifically illustrated) and the base portion of the fender section will likewise be of a flat or relatively flat configuration to conform to the configuration of the retaining channel.

It can be appreciated that the component costs of a fender installation as described above may be greater than the cost of simply purchasing resilient fendering material and securing such to the face of a piling. However, the component cost differential is largely, if not completely balanced by a much simpler and less expensive installation process and easier maintenance. Nevertheless, there are some marinas that prefer to secure the fender sections directly to the piling, without the use of a retaining channel installation as described above. For such installations, the present invention provides for significant improvement over the standard installation technique of simply securing fender sections by the use of a plurality of lag screws or the like for securing the fender sections by their side flanges.

An improvement according to the invention, shown in FIG. 4, involves the use of relatively rigid metal strips 40 which are placed over the opposite side flanges 41 of a fender strip 42, underlying a series of fastening devices 43, such as lag screws or the like. The strips 40, sometimes referred to as washer strips, may be as long as desired, even as long as the entire fendering section 42.

An important advantage of securing the fender flanges along an extended linear area is to prevent any tendency otherwise for the flange areas to lift up in the regions between adjacent fastening elements 43. This not only makes the installation somewhat unsightly, but also increases the opportunity for the fender to be engaged and torn in regions between successive fastening devices.

A piling fender arrangement as shown in FIG. 4 can be particularly useful where the cross sectional configuration of the fender element 41 is of the general type shown in FIG. 3, with a fender base 19 that is arcuately contoured to conform generally to the circular contours of the piling. However, where the marina operator attempts to apply a more conventional, flat base fendering element to a circular piling, the washer strips 40 can perform a very important function in conforming the otherwise flat fender flanges to the circular piling contour in regions between adjacent securing elements 43.

In the alternative embodiment illustrated in FIGS. 6 and 7, an arcuately configured fender 60 is secured to a cylindrical piling 61 by means of a plurality of spaced apart fasteners 62, such as lag screws, used in connection with rectangular washers 63. The rectangular washers 63 differ from the strip washers 40 of FIG. 4, in that they engage only a single fastening element 62, rather than a plurality thereof as in the case of the strip washers 40. The rectangular washers 63, however, are of substantially greater length than width, for example, two inches or so in length compared to, say, about one inch in width. The rectangular washers are installed with their long axes parallel to the longitudinal axis of the fender 60, as reflected in FIG. 6, such that the washer extends over and secures a maximum longitudinal area of the fender. The form of securement illustrated in FIGS. 6 and 7, can be effectively utilized where arcuately configured fenders 60 are mounted upon generally cylindrical pilings 61, since there is no significant problem of the flange area 64 of the fender tending to lift off of the piling in the space between successive fastening elements 62 (which maybe 12–18 inches, for example). Indeed, where the radius of the fender base 65 and flanges 64 is equal to or less than that of the piling, the edge extremities 66 of the flanges 64 will automatically tend to snugly contact the surface of the piling in the area between successive fasteners.

To particular advantage, the rectangular washer 63 may be provided with surface irregularities 67 on its bottom surface. This may be in the form of knurling, for example, or another kind of stamped or punched deformity that will tend to at least slightly dig into the surface of the fender flange 64. The provision of such surface irregularities tends to lock the washer into a properly aligned position as tightening pressure is applied by the fastening device 62, and resists an otherwise tendency for the washer to be rotated by the head of the fastening device 62, during final tightening rotations thereof.

A particularly advantageous form of rectangular washer 68 is indicated in FIGS. 8 and 9. The washer illustrated in FIG. 8 may be formed of a stiff stainless steel material, for example, with typical dimensions of around two inches in length, one inch in width. Each of the corner areas 69 of the washer 68 is bent downward at an angle of, for example, about 45 degrees to the plane of the body of the washer to form a triangular tab of about $\frac{1}{8}"$–$\frac{3}{16}"$, measured from base to tip. This forms four relatively sharp points 70, one at each corner. Accordingly, as the washer is pressed against the surface of the fender flange 64, during tightening of the lag screws 62, the corners dig in immediately and serve to lock the washer in its aligned position as the tightening continues. This is very useful in assisting the installer to keep all of the rectangular washers neatly aligned, and improving the overall appearance of the installation. The corner tabs 69 also secure the fender flanges more securely against the piling surface.

In the alternative embodiment shown in FIGS. 6 and 7, and also that shown in FIG. 4, significant advantages are realized by the use of fender flanges of reversely tapered configuration, in which the outer edges of the flanges are of greater thickness than the inner edges thereof. Where such flange configurations are employed, any tendency for the fender elements to be displaced laterally, as for example when impacted by a still-moving vessel, will be resisted more effectively than otherwise by the wedging action of the inversely tapered flange, which is being stressed by the vessel impact.

Although aspects of the basic cross section of the projecting portion of the fendering element 13 are known and available in a product previously on the market, certain important details of the configuration have been modified and improved to adapt the cross section to more effectively resist lateral impact, as from a vessel moving into the fender section while having some way on either forwardly or astern. In part such modification includes forming the base wall 19 of arcuate configuration, with the side flanges being similarly contoured and forming in effect continuations of the base wall 19. Additionally, the junctures of the various elements of the cross section have been significantly strengthened to resist the effects of impact distortion. To this end, the various intersections of the Y-shaped internal web with the curved outer wall 17 and the base wall 19 of the fender are given a radius of at least about $\frac{1}{8}$th inch, as indicated at 50 in FIG. 3. Likewise, where the several web sections of the "Y" join each other, in the central area 51, all of the web intersections are radiused as at 52, with at least a $\frac{1}{8}$th inch radius. Additionally, where the side walls 16 intersect with the base wall 19 and flanges 14, the intersections are radiused as at 53, also with a radius of at least about $\frac{1}{8}$th inch. This configuration greatly reduces the stresses in the fender material at the various intersections, when heavy lateral impact forces are resisted by lateral distortion of the fender.

As can be appreciated, when a fendering section is heavily impacted by a moving vessel, the projecting portion of the fender may be distorted substantially toward one side or the other of the retaining channel. For this reason, the edge extremities 54 of the channel-forming flanges 22 are smoothly rounded, to minimize any abrading or cutting action of the flanges 22.

The fendering system of the invention provides a uniquely advantageous arrangement for fendering of marina pilings and the like. In the primary form of the invention, utilizing a rigid, linear retaining channel, a uniform, neat-appearing system is presented by the marina, differing dramatically from the typical, conventional arrangements in which the resilient fendering sections are secured directly to the piling. In the latter case, the lateral edges of the fendering material often present a scalloped appearance, even if they are properly attached to the piling surface. Additionally, when the fastening elements break down from salt water corrosion, corrosion cracking or the like, portions of the resilient fenders become detached from the piling. This can leave the marina with an unsightly appearance, suggesting poor maintenance policies of the marina. With the system of the invention, the rigid retaining channels are secured to the face of the piling, which requires far fewer fastening elements than is required where the fendering material itself is secured by its opposite flanges. After installation of the retaining channel, the resilient fender elements are inserted from the top using one or more fender elements per retaining channel. The resulting assembly is neat, characterized by uniform, straight lines, with no fastening devices being evident externally, since all of the fastening devices are concealed underneath the resilient fender element.

Whereas replacement of a conventionally secured fendering element requires removal and replacement of multiple fastening devices on both sides of the fendering element, replacement of a fender section in the system of the invention can be accomplished by simply removing the fender from the upper end of the retaining channel and replacing it, or replacing a damaged section thereof with a new section, which is inserted into the channel in the same manner as the initial installation.

As will be apparent, the extra cost of the additional component (the retaining channel) can quickly be compensated for by the fact that substantially fewer securing elements 23 are required. Where the securing elements are formed of a proper marine grade of stainless steel, for example, they are individually quite expensive, and a substantial benefit is realized by reducing the number, and therefore the cost, of fastening elements. Additionally, the labor requirements, both for the initial installation and for any subsequent maintenance, are substantially reduced in relation to prior systems in which the fendering element is secured by individual fasteners applied to its opposite flanges.

Where the marina opts for a more conventional type of installation, by securing of the fender flanges directly to the piling, significant improvement can nevertheless be realized by, instead of simply fastening the fender flanges at spaced locations using for example lag screws and conventional disc washers, utilizing elongated strip washers of a suitable dimension to extend longitudinally along the fender flanges, covering a space of two or more (up to as many as desired) of the spaced apart fastening elements. This provides for a much neater looking installation, and also helps keep the flanges flat against the piling face in the spaces between fastening elements, minimizing the likelihood that the fender will be snagged and damaged by a vessel engaging the piling fender while still under way.

Individual rectangularly configured washers, secured by a single fastening element, also can be used to advantage, where the designed contours of the fender section correspond to those of the piling face, such that the piling flanges can be secured at spaced intervals, without any particular tendency for the flanges to lift away from the piling face, in the areas in-between. In this respect, it is also feasible to secure arcuately configured fender sections to flat piling faces using spaced apart individual fastening elements, because the arcuate flanges, in the areas between spaced apart fastener elements, naturally tend to press against the front face of the piling.

Particular advantage may be derived from the use of the fender sections provided with inversely tapered flanges, that is, flanges that are of greater thickness along their outer edges, than at their inner or root edges. Where fenders with such flanges are employed with rigid retaining channels, the opposite side channels thereof can be formed with similarly tapered walls, forming a side channel opening that is wider than the narrow portion of the fender flange, but narrower than the thicker, outer extremities of the fender flange, so that the fender flange strongly resists any tendency to force its removal in a lateral direction, as might be the tendency in the event of impact of the fender by a still-moving vessel. The inversely tapered flanges are also of significant benefit where the fenders are secured by strip washers, as shown in FIG. 4, or rectangular washers, as shown in FIGS. 6 and 7, because any tendency for the fender flange to be displaced laterally is more strongly resisted by the wedging action of the tapered flanges.

It should be understood, of course, that the specific forms of the invention herein illustrated and described are intended to be representative only, as certain changes may be made therein without departing from the clear teachings of the disclosure. Accordingly, reference should be made to the following appended claims in determining the full scope of the invention.

I claim:

1. A dock piling fender assembly for use in combination with a dock having vertical dock pilings, which comprises
    (a) an elongated fender element formed of continuously extruded, heavy duty resilient vinyl and having an outwardly projecting, resilient body portion, and flanges extending laterally in opposite directions from back portions of said body portion,
    (b) said fender element being positioned vertically along an outer face of a piling, and
    (c) a plurality of lag screws extending through said flanges and into said piling at a plurality of vertically spaced points therealong, said lag screws having heads of predetermined width dimensions,
    (d) said flanges being conformable generally to the surface configuration of said pilings,
    (e) a plurality of individual washers of elongated configuration, one such washer being associated with individual ones of said lag screws,
    (f) said washers being formed of stiff, generally flat metal material and having a length substantially greater than the width thereof, and said length being substantially greater than the predetermined width dimension of said lag screw head, to extend the pressure of said lag screw vertically above and below the lag screw head,
    (g) said individual washers being aligned along said flanges with long axes thereof substantially parallel with a principal axis of said fender, and
    (h) said washers having a principal plane and being formed with portions bent out of said principal plane and projecting below a bottom surface of said washers to dig into the resilient material of said flanges for anti-rotationally gripping said flanges to prevent rotation of said washers during tightening of said lag screws.

2. A dock piling fender assembly according to claim 1, wherein
    (a) said washers are of generally rectangular configuration, and
    said bent portions comprise downwardly bent portions at each of the corners of the rectangular washers, forming points for engagement with and digging into said flanges.

* * * * *